United States Patent
Jung et al.

(10) Patent No.: US 12,184,141 B2
(45) Date of Patent: Dec. 31, 2024

(54) STATOR FOR MOTOR AND MOTOR INCLUDING THE SAME

(71) Applicant: HYUNDAI MOBIS Co., Ltd., Seoul (KR)

(72) Inventors: Jin Ho Jung, Yongin-si (KR); Seong Jun Hwang, Yongin-si (KR); Yeong Woo Seo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 114 days.

(21) Appl. No.: 17/506,066

(22) Filed: Oct. 20, 2021

(65) Prior Publication Data

US 2022/0294300 A1    Sep. 15, 2022

(30) Foreign Application Priority Data

Mar. 9, 2021   (KR) .................. 10-2021-0030634

(51) Int. Cl.
*H02K 3/52*     (2006.01)
*H02K 3/28*     (2006.01)

(52) U.S. Cl.
CPC .............. *H02K 3/522* (2013.01); *H02K 3/28* (2013.01); *H02K 2203/09* (2013.01); *H02K 2203/12* (2013.01)

(58) Field of Classification Search
CPC ...... H02K 3/345; H02K 3/38; H02K 2203/09; H02K 2203/12
See application file for complete search history.

(56) References Cited

U.S. PATENT DOCUMENTS

| 10,396,607 B2 * | 8/2019 | Adachi ................. H02K 1/185 |
| 2004/0070293 A1 * | 4/2004 | Kabasawa ............. H02K 3/522 |
| | | 310/71 |
| 2005/0236922 A1 | 10/2005 | Yoneda et al. |

(Continued)

FOREIGN PATENT DOCUMENTS

| EP | 2 400 635 A1 | 12/2011 |
| JP | 2004-096841 A | 3/2004 |

(Continued)

OTHER PUBLICATIONS

Office Action issued in corresponding Korean Patent Application No. 10-2021-0030634 dated Dec. 6, 2022.

(Continued)

*Primary Examiner* — Daniel C Puentes
*Assistant Examiner* — Minki Chang
(74) *Attorney, Agent, or Firm* — MORGAN, LEWIS & BOCKIUS LLP (57) ABSTRACT

A stator for a motor includes a hole formed at a center thereof by arranging a plurality of assemblies along a circumferential direction (C) of the stator. Each of the plurality of assemblies includes: a stator core; a bobbin; a coil; and a plurality of bus bars disposed on the bobbin. The plurality of bus bars include first to third bus bars. In the plurality of assemblies, both ends of the first bus bar in the circumferential direction (C) and both ends of the second bus bar in the circumferential direction (C) are spaced apart from each other in the circumferential direction (C) while being spaced apart from each other in a radial direction (R) or an axial direction (A) of the stator.

15 Claims, 6 Drawing Sheets

(56) References Cited

U.S. PATENT DOCUMENTS

| | | | | |
|---|---|---|---|---|
| 2010/0207467 A1* | 8/2010 | Urano | ................... | H02K 3/522 |
| | | | | 310/71 |
| 2015/0061430 A1* | 3/2015 | Egami | ................... | H02K 3/522 |
| | | | | 310/71 |
| 2016/0329772 A1* | 11/2016 | Fukunaga | .............. | H02K 5/225 |

FOREIGN PATENT DOCUMENTS

| | | |
|---|---|---|
| JP | 2004-96841 A | 3/2004 |
| JP | 2009-100626 A | 5/2009 |
| JP | 2013-162636 A | 8/2013 |
| JP | 2018-074907 A | 5/2018 |
| JP | 2018-74907 A | 5/2018 |
| WO | 2009/041172 A2 | 4/2009 |

OTHER PUBLICATIONS

Extended European Search Report issued in corresponding European Patent Application No. 21203085.2 dated Apr. 22, 2022.
Notice of Allowance issued Jun. 2, 2023 for corresponding Korean Patent Application No. 10-2021-0030634.

\* cited by examiner

STATOR FOR MOTOR AND MOTOR INCLUDING THE SAME

CROSS-REFERENCE TO RELATED APPLICATION(S)

This application claims priority from and the benefit of Korean Patent Application No. 10-2021-0030634, filed on Mar. 9, 2021, which is hereby incorporated by reference for all purposes as if set forth herein.

TECHNICAL FIELD

Exemplary embodiments relate to a stator for a motor and a motor including the stator.

BACKGROUND

In order to overcome environmental pollution from existing internal-combustion engine automobiles and unstable supply and demand of fuel according to domestic and foreign environment, hybrid automobiles, electric automobiles, and the like have been actively developed and produced.

Such an electric automobile and a hybrid automobile are provided with a driving motor which is used for driving of the automobile. Such a motor has a structure in which a coil is wound around a stator core, and an injection-molded component, which is made of plastic and referred to as a bobbin, is used in the motor to prevent the coil from being damaged by the stator core. According to the related art, a motor has a structure in which a stator core and a bobbin are assembled, and a coil is wrapped around the bobbin.

Here, the motor has a structure in which a plurality of assemblies including stator cores, bobbins, and coils are coupled to each other. Particularly, in order for a plurality of assemblies constituting a driving motor for an automobile to receive power from a power supply unit, the plurality of assemblies and the power supply unit are electrically connected to each other by terminals.

However, according to the related art, the weight and production costs of the driving motor for an automobile increase due to the volume occupied by these terminals. Also, it is difficult to utilize a space around the terminals, and moreover, the structure of the driving motor becomes complicated.

In addition, according to the related art, there are many regions to be welded in the motor, and thus, processes required to manufacture the motor become complicated. Furthermore, a gap between the regions to be welded is not sufficiently secured, and thus, safety for insulation is deteriorated.

SUMMARY

Exemplary embodiments of the present invention provide for removing an existing terminal, thereby reducing weight and production costs of a driving motor of an automobile, increasing space utilization around the motor, and simplifying a structure of the motor.

Exemplary embodiments of the present invention further provide for: simplifying processes required for welding during manufacturing of the motor when compared to the related art; and improving safety for insulation by securing a sufficient gap between regions to be welded.

A first exemplary embodiment of the present invention provides a stator for a motor, the stator having a hole formed at a center thereof by arranging a plurality of assemblies along a circumferential direction (C), wherein each of the plurality of assemblies includes: a stator core; a bobbin disposed to surround an outer surface of the stator core; a coil which is wound multiple times around the bobbin and has a lead-in line and a lead-out line disposed at the respective ends thereof; and a plurality of bus bars disposed on the bobbin, wherein the plurality of bus bars include a first bus bar, a second bus bar, and a third bus bar, wherein in the plurality of assemblies, both ends of the first bus bar in the circumferential direction (C) and both ends of the second bus bar in the circumferential direction (C) are spaced apart from each other in the circumferential direction (C) while being spaced apart from each other in a radial direction (R) or an axial direction (A) of the stator.

In the plurality of assemblies, both of the ends of the second bus bar in the circumferential direction (C) and both ends of the third bus bar in the circumferential direction (C) may be spaced apart from each other in the circumferential direction (C) while being spaced apart from each other in the radial direction (R) or the axial direction (A).

The first bus bar may cross the second bus bar and the third bus bar.

The third bus bar may be disposed further outward than the second bus bar in the radial direction (R), wherein in the plurality of assemblies, the second bus bar is disposed to be biased in a first circumferential direction (C1) of both directions of the circumferential direction (C) with respect to the stator core and the bobbin, and the third bus bar is disposed to be biased in a second circumferential direction (C2) of both of the directions of the circumferential direction (C) with respect to the stator core and the bobbin.

The third bus bar may be disposed upward from the second bus bar in the axial direction (A), wherein in the plurality of assemblies, the second bus bar is disposed to be biased in a first circumferential direction (C1) of both directions of the circumferential direction (C) with respect to the stator core and the bobbin, and the third bus bar is disposed to be biased in a second circumferential direction (C2) of both of the directions of the circumferential direction (C) with respect to the stator core and the bobbin.

The plurality of assemblies may have sufficient similarity to be compatible with each other.

A bent portion bent in the axial direction (A) of the stator may be disposed at each of both of the ends of the first to third bus bars in the circumferential direction (C).

A bent portion bent outward in the radial direction (R) may be disposed at each of both of the ends of the first to third bus bars in the circumferential direction (C).

The plurality of assemblies may be divided into one or more first assemblies, one or more second assemblies, and one or more third assemblies, and each of the first assemblies, each of the second assemblies, and each of the third assemblies may be alternately arranged along the circumferential direction (C). One of the bent portions disposed in the first bus bar of the first assembly may be joined to one of the bent portions disposed in the third bus bar of the second assembly to form a junction region, and the other one of the bent portions disposed in the first bus bar of the first assembly may be joined to one of the bent portions disposed in the second bus bar of the third assembly to form a junction region. One of the bent portions disposed in the second bus bar of the first assembly may be joined to one of the bent portions disposed in the first bus bar of the second assembly to form a junction region, and the other one of the bent portions disposed in the second bus bar of the first assembly may be joined to one of the bent portions disposed in the third bus bar of the third assembly to form a junction region. One of the bent portions disposed in the third bus bar of the first assembly may be joined to one of the bent portions disposed in the second bus bar of the second assembly to form a junction region, and the other one of the bent portions disposed in the third bus bar of the first assembly may be joined to one of the bent portions disposed in the first bus bar of the third assembly to form a junction region.

The bent portions, which are disposed at both of the ends of the first bus bar disposed in the first assembly, may be respectively disposed within widths in the circumferential direction (C) of the second assembly and the third assembly adjacent to the first assembly in the circumferential direction (C).

One of the bent portions, which are disposed at both of the ends of the second bus bar disposed in the first assembly, may be disposed within a width of the first assembly in the circumferential direction (C), and the other one of the bent portions may be disposed in a region in the circumferential direction (C) between the first assembly and the third assembly adjacent to the first assembly in the circumferential direction (C).

One of the bent portions, which are disposed at both of the ends of the third bus bar disposed in the first assembly, may be disposed within a width of the first assembly in the circumferential direction (C), and the other one of the bent portions may be disposed in a region in the circumferential direction (C) between the first assembly and the second assembly adjacent to the first assembly in the circumferential direction (C).

One of the bent portions disposed in the first bus bar of the second assembly may be joined to one of the bent portions disposed in the third bus bar of the third assembly to form a junction region. One of the bent portions disposed in the second bus bar of the second assembly may be joined to one of the bent portions disposed in the first bus bar of the third assembly to form a junction region. One of the bent portions disposed in the third bus bar of the second assembly may be joined to one of the bent portions disposed in the second bus bar of the third assembly to form a junction region.

A portion of the bobbin may be disposed between the two neighboring junction regions among the plurality of the junction regions.

The stator may receive power from a power supply unit configured to supply three-phase power of U-phase power, V-phase power, and W-phase power, wherein the first assembly receives the U-phase power from the power supply unit through the lead-in line of the first assembly, the second assembly receives the V-phase power from the power supply unit through the lead-in line of the second assembly, and the third assembly receives the W-phase power from the power supply unit through the lead-in line of the third assembly.

The plurality of bus bars may further include a fourth bus bar, and a bent portion bent in the axial direction (A) or the radial direction (R) may be disposed at each of both ends of the fourth bus bar in the circumferential direction (C), wherein the bent portion disposed in the fourth bus bar is joined to another bent portion disposed in a neighboring fourth bus bar to form a junction region.

The first to third bus bars may be disposed in an outer portion of the bobbin in the radial direction (R), and the fourth bus bar may be disposed in an inner portion of the bobbin in the radial direction (R).

The first to third bus bars may be disposed in an upper region of the bobbin in the axial direction (A), and the fourth bus bar may be disposed in a lower region of the bobbin in the axial direction (A).

The lead-in line may be joined to the junction region, which is formed by the bent portion of the first bus bar and the bent portion of the third bus bar, or joined to the junction region, which is formed by the bent portion of the first bus bar and the bent portion of the second bus bar, and the lead-out line may be joined to the junction region which is formed by the bent portions of the fourth bus bars.

A second exemplary embodiment of the present invention provides a motor including: a stator; and a rotor, wherein the stator has a structure having a hole which is formed at a center thereof by arranging a plurality of assemblies along a circumferential direction (C), and the rotor is provided in the hole, wherein each of the plurality of assemblies includes: a stator core; a bobbin disposed to surround an outer surface of the stator core; a coil which is wound multiple times around the bobbin and has a lead-in line and a lead-out line disposed at the respective ends thereof; and a plurality of bus bars disposed on the bobbin, wherein the plurality of bus bars include a first bus bar, a second bus bar, and a third bus bar, wherein in the plurality of assemblies, both ends of the first bus bar in the circumferential direction (C) and both ends of the second bus bar in the circumferential direction (C) are spaced apart from each other in the circumferential direction (C) while being spaced apart from each other in a radial direction (R) or an axial direction (A) of the stator.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Hereinafter, a stator for a motor and the motor according to the present disclosure will be described with reference to the drawings.

Stator for Motor

Figure 1:
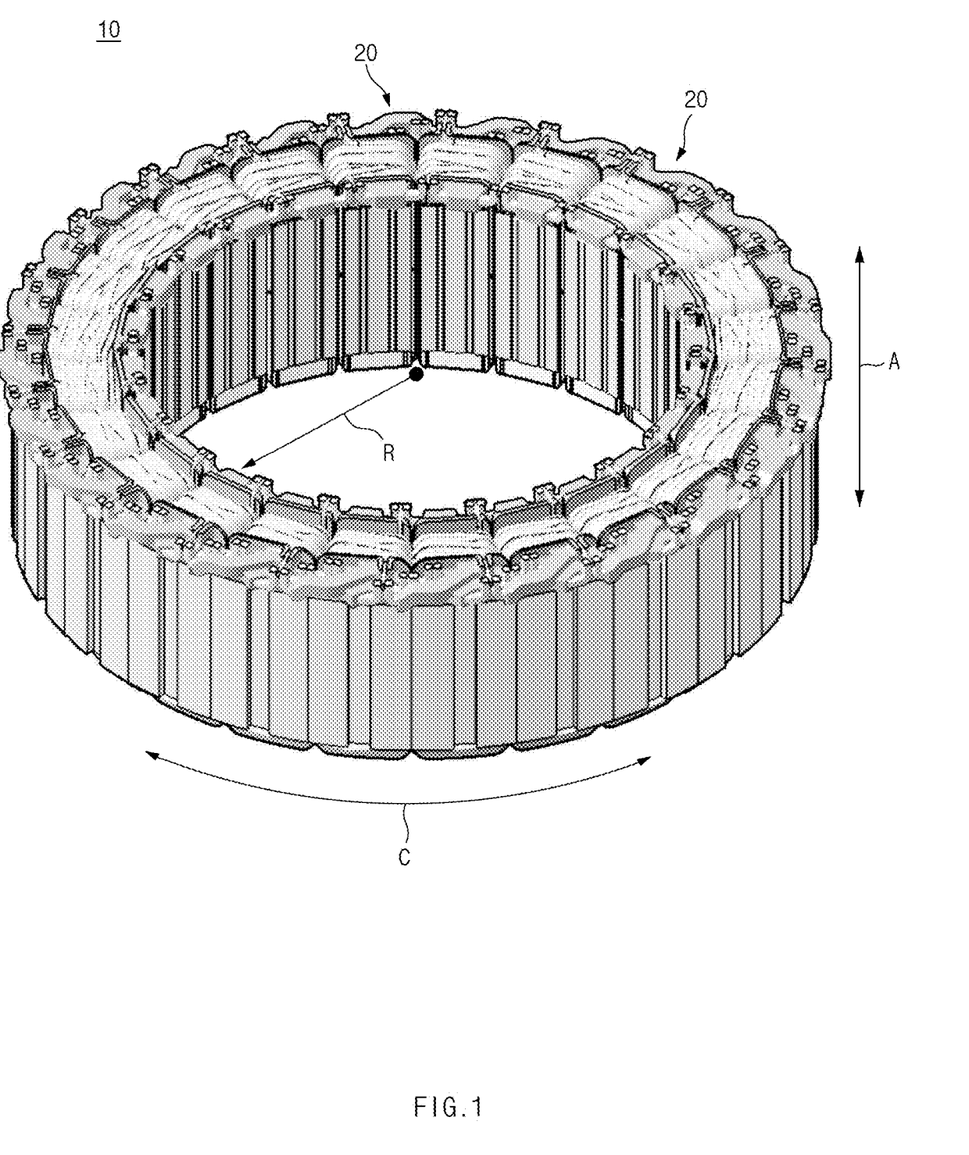
FIG. 1 is a perspective view illustrating a structure of a stator for a motor according to an exemplary embodiment of the present disclosure.
Figure 2:
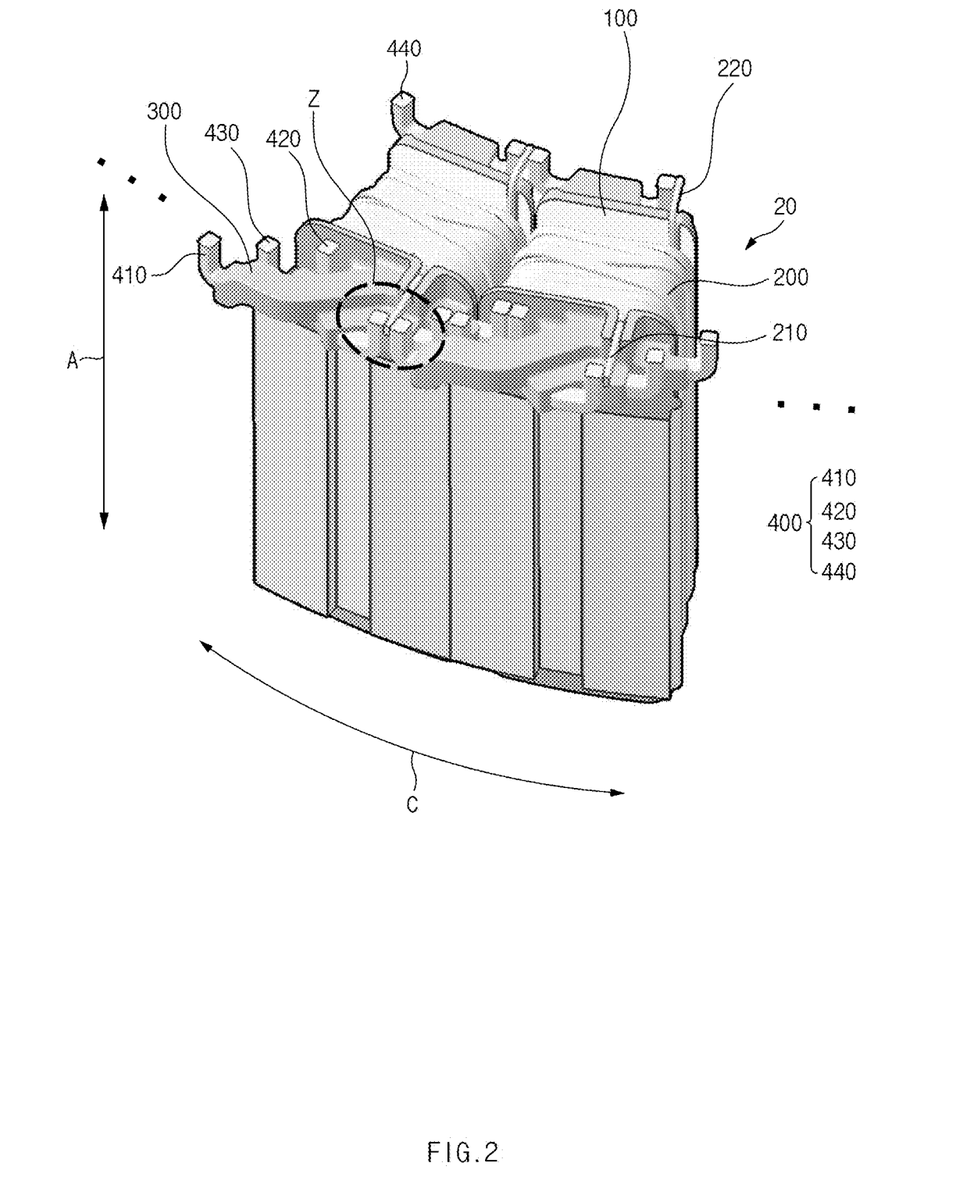
FIG. 2 is an enlarged perspective view illustrating assemblies that constitute the stator for a motor according to the exemplary embodiment of the present disclosure.
Figure 3:
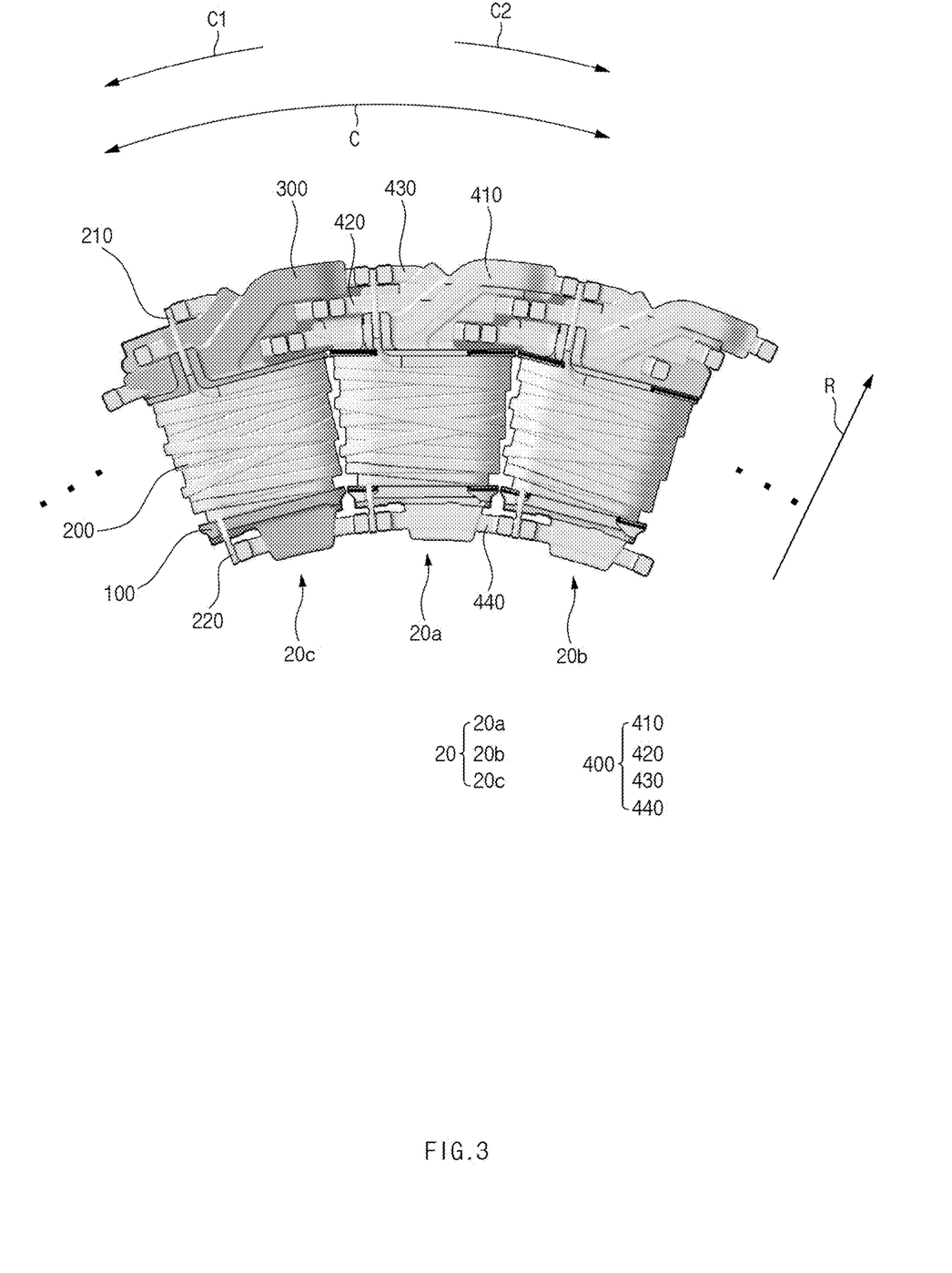
FIG. 3 is an enlarged plan view illustrating the assemblies that constitute the stator for a motor according to the exemplary embodiment of the present disclosure.
Figure 4:
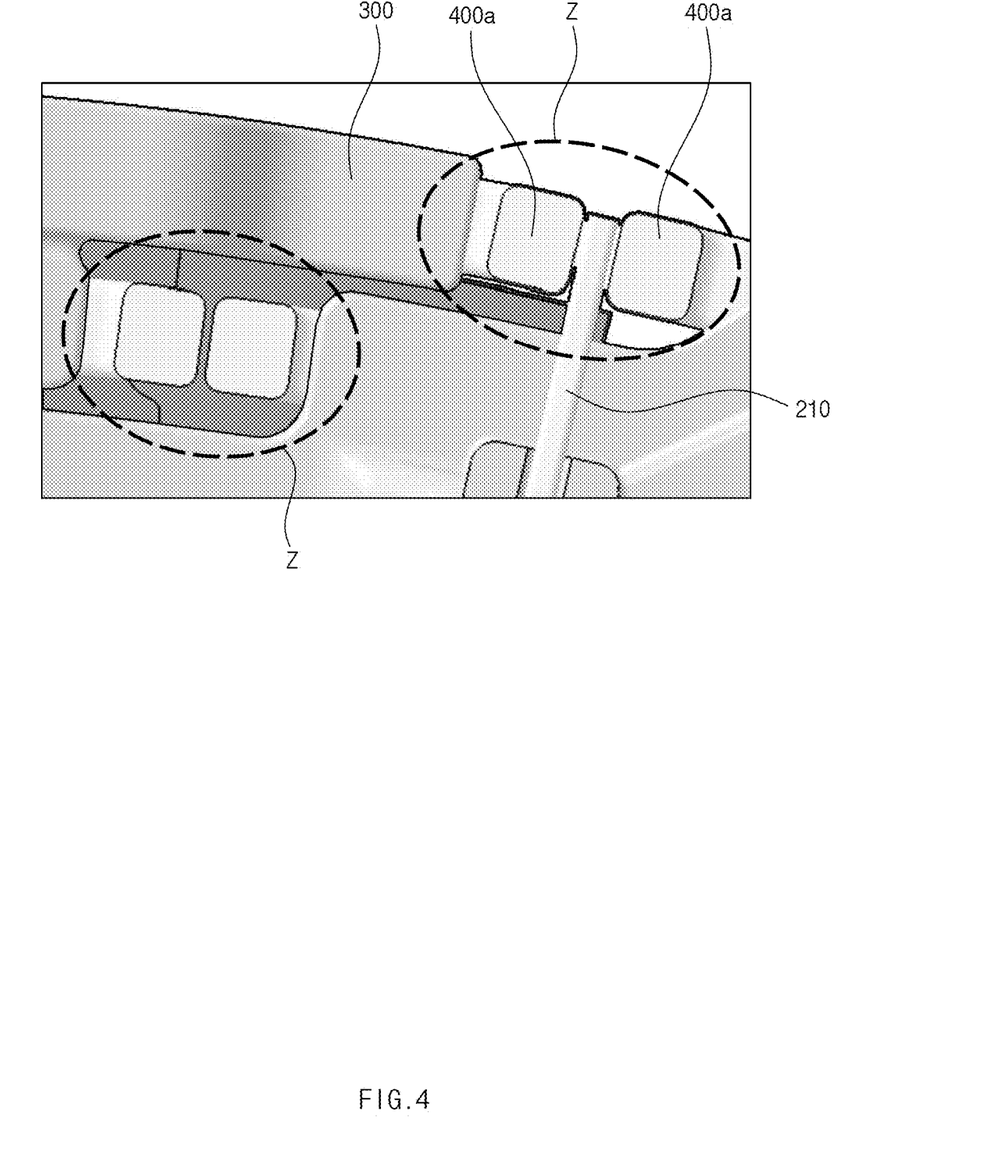
FIG. 4 is an enlarged view illustrating the vicinity of a junction region in the stator for a motor according to the exemplary embodiment of the present disclosure.

FIG. 1 is a perspective view illustrating a structure of a stator for a motor according to an exemplary embodiment of the present disclosure, and FIG. 2 is an enlarged perspective view illustrating assemblies that constitute the stator for a motor according to the exemplary embodiment of the present disclosure. FIG. 3 is an enlarged plan view illustrating the assemblies that constitute the stator for a motor according to the exemplary embodiment of the present disclosure, and FIG. 4 is an enlarged view illustrating the vicinity of a junction region in the stator for a motor according to the exemplary embodiment of the present disclosure.

Referring to FIG. 1, a stator for a motor according to the present disclosure (hereinafter, referred to as a 'stator 10') may have a structure having a hole which is formed at a center thereof by arranging a plurality of assemblies 20 along a circumferential direction C of the stator 10. As described later, a rotor may be provided in the hole. FIG. 1 illustrates a state in which the plurality of assemblies 20 are arranged in an approximately circular shape to form a circular hole. However, unlike the above configuration, the plurality of assemblies may be arranged along closed curves having various shapes, and the holes may also have shapes corresponding thereto.

Also, as illustrated in FIGS. 2 and 3, each of assemblies 20 that constitute the stator 10 may include a stator core 100, a coil 200, and a bobbin 300. The bobbin 300 may be provided to surround the outer surface of the stator core 100. This may be understood as that the stator core 100 has a structure inserted into an empty space formed in the bobbin 300.

Meanwhile, the coil 200 may be configured to be wound multiple times around the outer surface of the bobbin 300, and a lead-in line 210 and a lead-out line 220 may be provided at the respective ends of the coil 200 in the longitudinal direction. The lead-in line 210 and the lead-out line 220 may protrude outward.

According to the present disclosure, a magnetic field is formed around the coil 200 when current flows through the coil 200. Accordingly, an induced electromotive force is generated in a rotor provided in a motor by a change in magnetic field, and the rotor begins to rotate. A driving principal of the motor is a well-known technical feature, and thus, description thereof will be omitted.

Meanwhile, the stator 10 according to the present disclosure may further include a plurality of bus bars 400 disposed in the bobbin 300. The bus bars 400 may provide paths through which the assemblies 20 constituting the stator 10 receives power from a power supply unit. To this end, one of the plurality of bus bars 400 provided in each of the assemblies 20 may be connected to the lead-in line 210. Also, another one of the plurality of bus bars 400 provided in each of the assemblies 20 may be connected to the lead-out line 220. More preferably, the lead-in line 210 may be joined to one of the plurality of bus bars 400, and the lead-out line 220 may be joined to another one of the plurality of bus bars 400. For example, the joining may be performed by welding.

Meanwhile, the plurality of assemblies 20 constituting stator 10 according to the present disclosure may have the same structure. Here, the feature in which the plurality of assemblies 20 have the same structure may be understood as that the plurality of assemblies are so similar to each other that the plurality of assemblies can be recognized as compatible components, when one of ordinary skill in the art to which this disclosure belongs briefly examines relative positions of the stator cores, the coils, the bobbins, and the bus bars that constitute the plurality of assemblies.

Nonetheless, according to the present disclosure, the plurality of assemblies 20 constituting the stator 10 may be divided into a plurality of groups. For example, referring to FIG. 3, the plurality of assemblies 20 may be divided into one or more first assemblies 20a, one or more second assemblies 20b, and one or more third assemblies 20c. However, this is not intended to suggest that structures of the first to third assemblies are different from each other. Rather, according to a preferred example of the present disclosure, the first to third assemblies 20a, 20b, and 20c may have the same structure. As described later, the assemblies may be divided into the first to third assemblies 20a, 20b, and 20c depending on what types of power phases the assemblies receive from the power supply unit.

Meanwhile, as illustrated in FIGS. 1 to 3, the stator 10 may have a structure in which each of the first assemblies 20a, each of the second assemblies 20b, and each of the third assemblies 20c are alternately arranged along the circumferential direction C.

For example, the second assembly 20b and the third assembly 20c may be respectively disposed on one side of the first assembly 20a and the other side of the first assembly 20a opposite to the one side in the circumferential direction C. The first assembly 20a and the third assembly 20c may be respectively disposed on one side of the second assembly 20b and the other side of the second assembly 20b opposite to the one side in the circumferential direction C. The first assembly 20a and the second assembly 20b may be respectively disposed on one side of the third assembly 20c and the other side of the third assembly 20c opposite to the one side in the circumferential direction C. Thus, the numbers of first to third assemblies provided in the stator 10 may be the same as one another. Hereinafter, in the specification, among both directions of the circumferential direction C of the stator 10, a direction, in which the third assembly 20c is disposed with respect to the first assembly 20a, is referred to as a first circumferential direction C1, and a direction, in which the second assembly 20b is disposed with respect to the first assembly 20a, is referred to as a second circumferential direction C2.

Continuing to refer to FIGS. 1 to 3, some of the bus bars 400 provided in the assemblies 20 of the stator 10 according to the present disclosure may cross other bus bars of the plurality of bus bars 400.

More specifically, the bus bars 400 may include a first bus bar 410, a second bus bar 420, a third bus bar 430, and a fourth bus bar 440.

Here, according to the present disclosure, the first bus bar 410 may sequentially cross the second bus bar 420 and the third bus bar 430. Also, the first bus bar 410 may not cross the fourth bus bar 440, and the second to fourth bus bars 420, 430, and 440 may not cross each other. Also, the second bus bar 420 and the third bus bar 430 may be provided parallel to each other. More preferably, the second bus bar 420 and the third bus bar 430 may have the same size and shape.

In the present disclosure, terminals for connecting a motor according to the related art to a power supply unit are removed, and instead, the plurality of bus bars are provided. Thus, the volume occupied by the terminals according to the related art may be reduced, and the weight and production costs of the terminals may be reduced.

Particularly, according to the present disclosure, some the plurality of bus bars 400 provided in the assemblies 20 have structures crossing each other, and thus, the volume occupied by the plurality of bus bars serving as the terminals according to the related art may be reduced as much as possible. Therefore, the volume and structure of the motor for an automobile according to the present disclosure may be simplified.

Meanwhile, as illustrated in FIGS. 2 and 3, in each of the plurality of assemblies 20 according to the exemplary embodiment of the present disclosure, both ends of the first bus bar 410 in the circumferential direction C and both ends of the second bus bar 420 in the circumferential direction C may be provided spaced apart from each other in the circumferential direction C while being spaced apart from each other in a radial direction R of the stator 10. Furthermore, as illustrated in FIGS. 2 and 3, in each of the plurality of assemblies 20 according to the exemplary embodiment of the present disclosure, both ends of the second bus bar 420 in the circumferential direction C and both ends of the third bus bar 430 in the circumferential direction C may be provided spaced apart from each other in the circumferential direction C while being spaced apart from each other in the radial direction R.

As described later, according to the present disclosure, bent portions may be respectively formed at both of the ends of each of the bus bars, and the bus bars are joined through the bent portion to form a junction region. Here, according to the exemplary embodiment of the present disclosure, both of the ends of the first to third bus bars in any of the assemblies are provided spaced apart from each other in the radial direction R and the circumferential direction C, and thus, the gaps between the junction regions may increase. Accordingly, it is possible to improve the safety for insulation of the stator and the motor.

As illustrated in FIG. 3, in each of the assemblies 20a, 20b, and 20c according to the exemplary embodiment of the present disclosure, the third bus bar 430 may be provided further outward than the second bus bar 420 in the radial direction R. Here, according to the exemplary embodiment of the present disclosure, the second bus bar 420 may be provided to be biased in the first circumferential direction C1 with respect to the stator core 100 and the bobbin 300, and the third bus bar 430 may be provided to be biased in the second circumferential direction C2 with respect to the stator core 100 and the bobbin 300.

Also, as illustrated in FIGS. 1 to 3, according to the exemplary embodiment of the present disclosure, a bent portion 400a bent in an axial direction A of the stator 10 may be provided at each of both of the ends of the first to fourth bus bars 410, 420, 430, and 440 in the circumferential direction C.

Meanwhile, according to the present disclosure, the plurality of first assemblies 20a may be electrically connected to each other by the bus bars 400, the plurality of second assemblies 20b may be electrically connected to each other by the bus bars 400, and the plurality of third assemblies 20c may be electrically connected to each other by the bus bars 400.

More specifically, referring to FIGS. 3 and 4, one of the bent portions 400a provided in the first bus bar 410 of the first assembly 20a may be joined to one of the bent portions 400a provided in the third bus bar 430 of the second assembly 20b to form a junction region Z, and the other one of the bent portions 400a provided in the first bus bar 410 of the first assembly 20a may be joined to one of the bent portions 400a provided in the second bus bar 420 of the third assembly 20c to form a junction region Z.

Also, one of the bent portions 400a provided in the second bus bar 420 of the first assembly 20a may be joined to one of the bent portions 400a provided in the first bus bar 410 of the second assembly 20b to form a junction region Z, and the other one of the bent portions 400a provided in the second bus bar 420 of the first assembly 20a may be joined to one of the bent portions 400a provided in the third bus bar 430 of the third assembly 20c to form a junction region Z.

Also, one of the bent portions 400a provided in the third bus bar 430 of the first assembly 20a may be joined to one of the bent portions 400a provided in the second bus bar 420 of the second assembly 20b to form a junction region Z, and the other one of the bent portions 400a provided in the third bus bar 430 of the first assembly 20a may be joined to one of the bent portions 400a provided in the first bus bar 410 of the third assembly 20c to form a junction region Z.

Also, the bent portion 400a provided in the fourth bus bar 440 provided in each of the first to third assemblies 20a, 20b, and 20c may be joined to the bent portion 400a provided in another fourth bus bar 440 adjacent in the circumferential direction C, thereby forming a junction region Z.

Also, one of the bent portions 400a provided in the first bus bar 410 of the second assembly 20b may be joined to one of the bent portions 400a provided in the third bus bar 430 of the third assembly 20c to form a junction region Z.

Also, one of the bent portions 400a provided in the second bus bar 420 of the second assembly 20b may be joined to one of the bent portions 400a provided in the first bus bar 410 of the third assembly 20c to form a junction region Z.

Also, one of the bent portions 400a provided in the third bus bar 430 of the second assembly 20b may be joined to one of the bent portions 400a provided in the second bus bar 420 of the third assembly 20c to form a junction region Z.

Meanwhile, according to the present disclosure as illustrated in FIGS. 2 and 3, the lead-in line 210 provided in the coil 200 may be joined to the junction region which is formed by joining the bent portion of the first bus bar 410 to the bent portion of the third bus bar 430, and the lead-out line 220 provided in the coil 200 may be joined to the junction region which is formed by joining the bent portions of the fourth bus bars 440 to each other. However, unlike those illustrated in FIGS. 2 and 3, the lead-in line 210 provided in the coil 200 may be joined to the junction region which is formed by joining the bent portion of the first bus bar 410 to the bent portion of the second bus bar 420.

According to the present disclosure as described above, the lead-in line and the lead-out line may be joined to the junction region formed by joining the bent portions of the bus bars to each other, and thus, a separate joining process for joining the lead-in line and the lead-out line to the bus bars is not necessary. Thus, according to the present disclosure, the joining processes required to manufacture the stator or the motor may be simplified.

In a case in which the first to third bus bars 410, 420, and 430 provided in the first assemblies 20a, the first to third bus bars 410, 420, and 430 provided in the second assemblies 20b, and the first to third bus bars 410, 420, and 430 provided in the third assemblies 20c are connected to each other in the manner described above, lead-in lines 210 formed in the coils 200 of the first assemblies 20a may be electrically connected to each other by the bus bars 400, lead-in lines 210 formed in the coils 200 of the second assemblies 20b may be electrically connected to each other by the bus bars 400, and lead-in lines 210 formed in the coils 200 of the third assemblies 20c may be electrically connected to each other by the bus bars 400.

Meanwhile, according to the present disclosure, the stator 10 may receive power from a power supply unit (not shown) that supplies three-phase AC power of U-phase power, V-phase power, and W-phase power.

Here, the first assembly 20a may receive the U-phase power from the power supply unit via the lead-in line 210 of the first assembly 20a, the second assembly 20b may receive the V-phase power from the power supply unit via the lead-in line 210 of the second assembly 20b, and the third assembly 20c may receive the W-phase power from the power supply unit via the lead-in line 210 of the third assembly 20c. That is, the first to third assemblies 20a, 20b, and 20c may receive power having different phases via the respective lead-in lines 210.

Meanwhile, the first to third assemblies 20a, 20b, and 20c may be connected to a neutral line via respective lead-out lines 220 of the first to third assemblies 20a, 20b, and 20c. Thus, all of the first to third assemblies 20a, 20b, and 20c may be connected to the neutral line by the lead-out lines 220.

Figure 5:
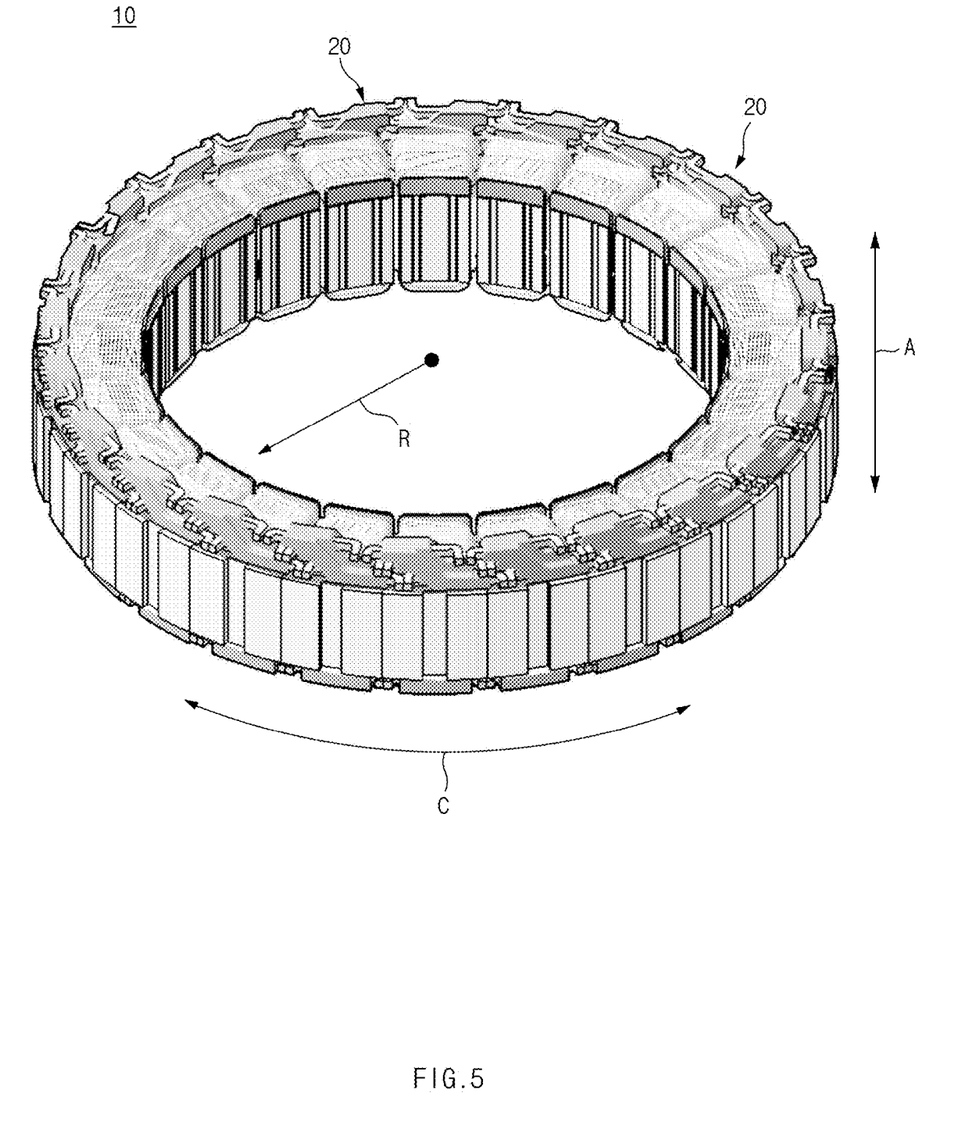
FIG. 5 is a perspective view illustrating a structure of a stator for a motor according to another exemplary embodiment of the present disclosure.
Figure 6:
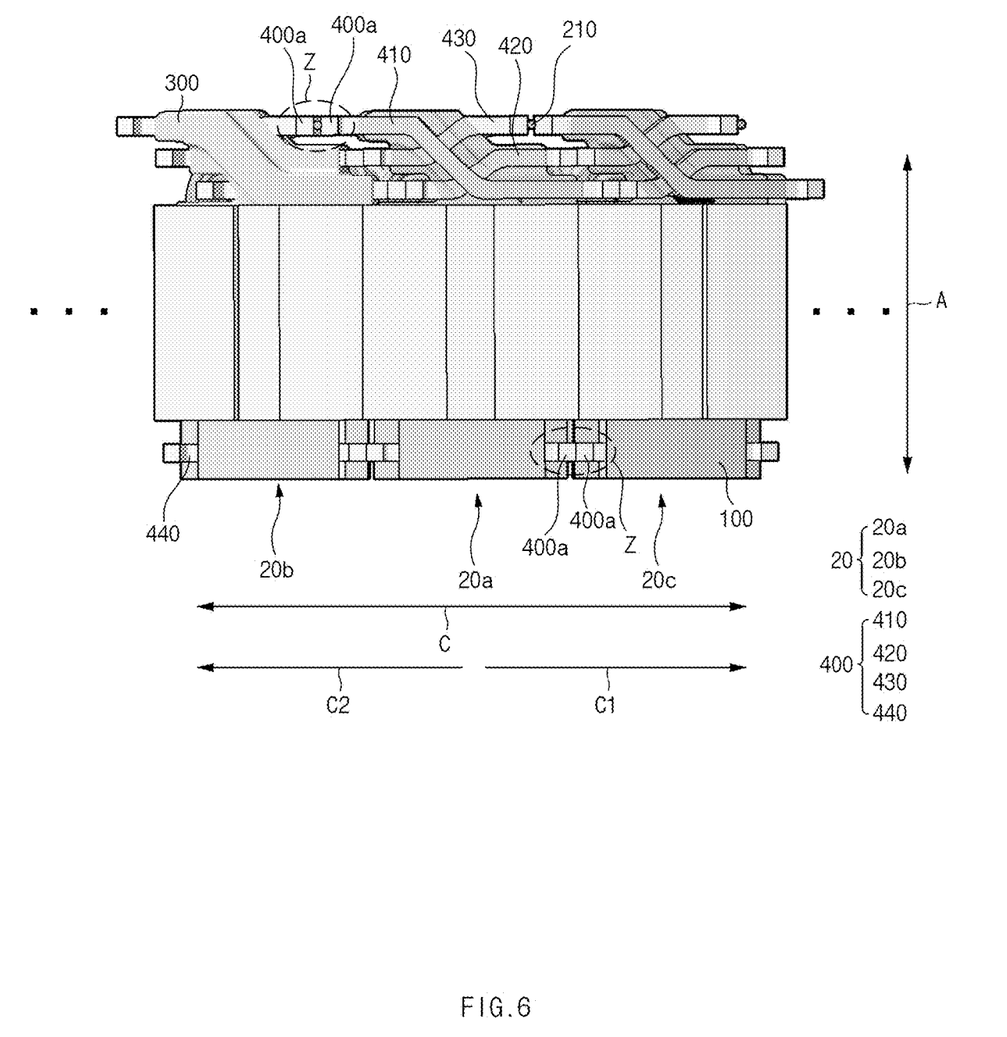
FIG. 6 is an enlarged side view illustrating assemblies that constitute the stator for a motor according to another exemplary embodiment of the present disclosure.

FIG. 5 is a perspective view illustrating a structure of a stator for a motor according to another exemplary embodiment of the present disclosure, and FIG. 6 is an enlarged side view illustrating assemblies that constitute the stator for a motor according to another exemplary embodiment of the present disclosure. Hereinafter, the stator according to another exemplary embodiment of the present disclosure will be described mainly with respect to differences from the features which have been described above. Within a range not contradicting features to be described below with respect to the stator according to another exemplary embodiment of the present disclosure, the features described above with respect to the stator according to the present disclosure may also be applied, in the same manner, to the stator according to another exemplary embodiment of the present disclosure.

According to another exemplary embodiment of the present disclosure as illustrated in FIGS. 5 and 6, both ends of a first bus bar 410 in a circumferential direction C and both ends of a second bus bar 420 in the circumferential direction C may be provided spaced apart from each other in the circumferential direction C while being spaced apart from each other in an axial direction A. Also, both of the ends of the second bus bar 420 in the circumferential direction C and both ends of the third bus bar 430 in the circumferential direction C may be provided spaced apart from each other in the circumferential direction C while being spaced apart from each other in the axial direction A. That is, the stator according to another exemplary embodiment of the present disclosure is different from the stator according to the exemplary embodiment of the present disclosure in that both of the ends of the first bus bar 410 and both of the ends of the second bus bar 420, and both of the ends of the second bus bar 420 and both of the ends of the third bus bar 430 are spaced apart from each other in the axial direction A rather than the radial direction R.

More specifically, the third bus bar 430 may be provided above the second bus bar 420 in the axial direction A of the stator 10. Here, according to another exemplary embodiment of the present disclosure, the second bus bar 420 may be provided to be biased in a first circumferential direction C1 with respect to a stator core 100 and a bobbin 300, and the third bus bar 430 may be provided to be biased in a second circumferential direction C2 with respect to the stator core 100 and the bobbin 300.

Also, as illustrated in FIGS. 5 and 6, according to another exemplary embodiment of the present disclosure, a bent portion 400a bent outward in the radial direction R may be provided at each of both of the ends of the first to fourth bus bars 410, 420, 430, and 440 in the circumferential direction C.

Features of the stator according to another exemplary embodiment of the present disclosure in addition to the features of the stator according to another exemplary embodiment of the present disclosure which have been described above can be supplemented with the features described with reference to FIGS. 1 to 4.

Meanwhile, as illustrated in FIGS. 3 and 6, the bent portions 400a, which are provided at both of the ends of the first bus bar 410 provided in the first assembly 20a of the stator 10 according to the present disclosure, may be respectively provided within widths in the circumferential direction C of the second assembly 20b and the third assembly 20c adjacent to the first assembly 20a in the circumferential direction C. This may be understood as that the bent portion of the first bus bar 410 provided in each of the assemblies is provided overlapping a neighboring assembly when the stator 10 according to the present disclosure is viewed from the side in the radial direction R.

Also, as illustrated in FIGS. 3 and 6, one of the bent portions 400a, which are provided at both of the ends of the second bus bar 420 provided in the first assembly 20a of the stator 10 according to the present disclosure, may be provided within a width of the first assembly 20a in the circumferential direction C, and the other one of the bent portions 400a may be provided in a region in the circumferential direction C between the first assembly 20a and the third assembly 20c adjacent to the first assembly 20a in the circumferential direction C.

Also, as illustrated in FIGS. 3 and 6, one of the bent portions 400a, which are provided at both of the ends of the third bus bar 430 provided in the first assembly 20a of the stator 10 according to the present disclosure, may be provided within a width of the first assembly 20a in the circumferential direction C, and the other one of the bent portions 400a may be provided in a region in the circumferential direction C between the first assembly 20a and the second assembly 20b adjacent to the first assembly 20a in the circumferential direction C.

Meanwhile, according to the present disclosure as illustrated in FIG. 4, a portion of the bobbin 300 may be disposed between the two junction regions Z adjacent to each other among the junction regions Z formed by the two neighboring bent portions 400a. This may be understood as that a portion of the bobbin 300 is disposed within the shortest distance of the straight line path between the two junction regions Z. In this case, the distance between the two neighboring junction regions Z may be increased, and thus, electrical insulating properties may be improved.

Meanwhile, according to the exemplary embodiment of the present disclosure as illustrated in FIGS. 1 to 4, the first to third bus bars 410, 420, and 430 may be disposed in an outer portion of the bobbin 300 in the radial direction R, and the fourth bus bar 440 may be disposed in an inner portion of the bobbin 300 in the radial direction R.

On the other hand, according to another exemplary embodiment of the present disclosure as illustrated in FIGS. 5 and 6, the first to third bus bars 410, 420, and 430 may be disposed in an upper region of the bobbin 300 in the axial direction A, and the fourth bus bar 440 may be disposed in a lower region of the bobbin 300 in the axial direction A.

Motor

Referring to FIGS. 1 to 6, a motor according to the present disclosure may include a stator 10 and a rotor (not shown). More preferably, the stator 10 may have a structure having a hole which is formed at a center thereof by arranging a plurality of assemblies 20 along a circumferential direction C, and the rotor is provided in the hole.

Here, according to the present disclosure, each of the plurality of assemblies 20 may include: a stator core 100; a bobbin 300 provided to surround an outer surface of the stator core 100; a coil 200 which is wound multiple times around the bobbin 300 and has a lead-in line 210 and a lead-out line 220 provided at the respective ends thereof; and a plurality of bus bars 400 disposed on the bobbin 300.

Also, the plurality of bus bars 400 may include a first bus bar 410, a second bus bar 420, and a third bus bar 430, and a fourth bus bar 440.

Also, in the plurality of assemblies 20, both ends of the first bus bar 410 in the circumferential direction C and both ends of the second bus bar 420 in the circumferential direction C may be provided spaced apart from each other in the circumferential direction C while being spaced apart from each other in a radial direction R or an axial direction A.

According to the present disclosure, the existing terminal may be removed, thereby reducing the weight and production costs of the driving motor of an automobile, increasing the space utilization around the motor, and simplifying the structure of the motor.

Also, according to the present disclosure, processes required for welding during manufacturing of the motor may be simplified when compared to the related art, and the safety for insulation may be improved by securing the sufficient gap between the regions to be welded.

Although the present disclosure has been described with specific exemplary embodiments and drawings, the present disclosure is not limited thereto, and it is obvious that various changes and modifications may be made by a person skilled in the art to which the present disclosure pertains within the technical idea of the present disclosure and equivalent scope of the appended claims.

What is claimed is:

1. A stator for a motor, comprising a hole formed at a center thereof by arranging a plurality of assemblies along a circumferential direction (C) of the stator,
    wherein each of the plurality of assemblies comprises:
        a stator core;
        a bobbin disposed to surround an outer surface of the stator core;
        a coil which is wound multiple times around the bobbin and has a lead-in line and a lead-out line disposed at respective ends of the coil; and
        a plurality of bus bars disposed on the bobbin,
    wherein the plurality of bus bars comprise a first bus bar, a second bus bar, and a third bus bar,
    wherein in the plurality of assemblies, both ends of the first bus bar in the circumferential direction (C) and both ends of the second bus bar in the circumferential direction (C) are spaced apart from each other in the circumferential direction (C) while being spaced apart from each other in a radial direction (R) or an axial direction (A) of the stator,
    wherein in the plurality of assemblies, both of the ends of the second bus bar in the circumferential direction (C) and both ends of the third bus bar in the circumferential direction (C) are spaced apart from each other in the circumferential direction (C) while being spaced apart from each other in the radial direction (R) or the axial direction (A),
    wherein the first bus bar crosses the second bus bar and the third bus bar,
    wherein the third bus bar is disposed further outward than the second bus bar in the radial direction (R),
    wherein in the plurality of assemblies, the second bus bar is disposed to be biased in a first circumferential direction (C1) of both directions of the circumferential direction (C) with respect to the stator core and the bobbin, and the third bus bar is disposed to be biased in a second circumferential direction (C2) of both of the directions of the circumferential direction (C) with respect to the stator core and the bobbin,
    wherein a bent portion bent in the axial direction (A) of the stator is disposed at each of both of the ends of the first to third bus bars in the circumferential direction (C), wherein the plurality of assemblies are divided into one or more first assemblies, one or more second assemblies, and one or more third assemblies,
    each of the first assemblies, each of the second assemblies, and each of the third assemblies are alternately arranged along the circumferential direction (C), and
    wherein a first one of the bent portions disposed in the first bus bar of a first assembly among the one or more first assemblies is joined to a first one of the bent portions disposed in the third bus bar of a second assembly, disposed immediately after the first assembly among the one or more second assemblies, to form a junction region, and a second one of the bent portions disposed in the first bus bar of the first assembly is joined to a first one of the bent portions disposed in the second bus bar of a third assembly, disposed immediately before the first assembly among the one or more third assemblies, to form a junction region,
    a first one of the bent portions disposed in the second bus bar of the first assembly is joined to a first one of the bent portions disposed in the first bus bar of the second assembly to form a junction region, and a second one of the bent portions disposed in the second bus bar of the first assembly is joined to a first one of the bent portions disposed in the third bus bar of the third assembly to form a junction region, and
    a first one of the bent portions disposed in the third bus bar of the first assembly is joined to a first one of the bent portions disposed in the second bus bar of the second assembly to form a junction region, and a second one of the bent portions disposed in the third bus bar of the first assembly is joined to a first one of the bent portions disposed in the first bus bar of the third assembly to form a junction region.

2. The stator of claim 1, wherein the third bus bar is disposed upward from the second bus bar in the axial direction (A),
    wherein in the plurality of assemblies, the second bus bar is disposed to be biased in a first circumferential direction (C1) of both directions of the circumferential direction (C) with respect to the stator core and the bobbin, and the third bus bar is disposed to be biased in a second circumferential direction (C2) of both of the directions of the circumferential direction (C) with respect to the stator core and the bobbin.

3. The stator of claim 2, wherein a bent portion bent outward in the radial direction (R) is disposed at each of both of the ends of the first to third bus bars in the circumferential direction (C).

4. The stator of claim 1, wherein the plurality of assemblies are compatible with each other.

5. The stator of claim 1, wherein the bent portions, which are disposed at both of the ends of the first bus bar disposed in the first assembly, are respectively disposed within widths in the circumferential direction (C) of the second assembly and the third assembly adjacent to the first assembly in the circumferential direction (C).

6. The stator of claim 1, wherein the first one of the bent portions, which are disposed at both of the ends of the second bus bar disposed in the first assembly, is disposed within a width of the first assembly in the circumferential direction (C), and the second one of the bent portions disposed in the second bus bar of the first assembly is disposed in a region between the first assembly and the third assembly adjacent to the first assembly in the circumferential direction (C).

7. The stator of claim 1, wherein the first one of the bent portions, which are disposed at both of the ends of the third bus bar disposed in the first assembly, is disposed within a width of the first assembly in the circumferential direction (C), and the second one of the bent portions disposed in the third bus bar of the first assembly is disposed in a region between the first assembly and the second assembly adjacent to the first assembly in the circumferential direction (C).

8. The stator of claim 1, wherein a second one of the bent portions disposed in the first bus bar of the second assembly is joined to a first of the bent portions disposed in the third bus bar of another third assembly, disposed immediately after the second assembly among the one or more third assemblies, to form a junction region,
   a second one of the bent portions disposed in the second bus bar of the second assembly is joined to a first one of the bent portions disposed in the first bus bar of the third assembly, disposed immediately after the second assembly, to form a junction region, and
   a second one of the bent portions disposed in the third bus bar of the second assembly is joined to a first one of the bent portions disposed in the second bus bar of the third assembly, disposed immediately after the second assembly, to form a junction region.

9. The stator of claim 8, wherein a portion of the bobbin is disposed between the two neighboring junction regions among the plurality of the junction regions.

10. The stator of claim 8, wherein the stator receives power from a power supply unit configured to supply three-phase power of U-phase power, V-phase power, and W-phase power,
    wherein the first assembly receives the U-phase power from the power supply unit through the lead-in line of the first assembly,
    the second assembly receives the V-phase power from the power supply unit through the lead-in line of the second assembly, and
    the third assembly receives the W-phase power from the power supply unit through the lead-in line of the third assembly.

11. The stator of claim 8, wherein the plurality of bus bars further comprise a fourth bus bar, and
    a bent portion bent in the axial direction (A) or the radial direction (R) is disposed at each of both ends of the fourth bus bar in the circumferential direction (C),
    wherein the bent portion disposed in the fourth bus bar is joined to another bent portion disposed in a neighboring fourth bus bar to form a junction region.

12. The stator of claim 11, wherein the first to third bus bars are disposed in an outer portion of the bobbin in the radial direction (R), and
    the fourth bus bar is disposed in an inner portion of the bobbin in the radial direction (R).

13. The stator of claim 11, wherein the first to third bus bars are disposed in an upper region of the bobbin in the axial direction (A), and
    the fourth bus bar is disposed in a lower region of the bobbin in the axial direction (A).

14. The stator of claim 11, wherein the lead-in line of each of the plurality of assemblies is joined to the junction region, which is formed by one of the bent portions of the first bus bar and one of the bent portions of the third bus bar, or joined to the junction region, which is formed by another one of the bent portions of the first bus bar and one of the bent portions of the second bus bar, and
    the lead-out line of each of the plurality of assemblies is joined to the junction region which is formed by the bent portions of the fourth bus bars.

15. A motor comprising:
    a stator; and
    a rotor,
    wherein the stator has a structure having a hole which is formed at a center thereof by arranging a plurality of assemblies along a circumferential direction (C) of the stator, and
    the rotor is disposed in the hole,
    wherein each of the plurality of assemblies comprises:
        a stator core;
        a bobbin disposed to surround an outer surface of the stator core;
        a coil which is wound multiple times around the bobbin and has a lead-in line and a lead-out line disposed at respective ends of the coil; and
        a plurality of bus bars disposed on the bobbin,
    wherein the plurality of bus bars comprise a first bus bar, a second bus bar, and a third bus bar,
    wherein the plurality of assemblies, both ends of the first bus bar in the circumferential direction (C) and both ends of the second bus bar in the circumferential direction (C) are spaced apart from each other in the circumferential direction (C) while being spaced apart from each other in a radial direction (R) or an axial direction (A) of the stator,
    wherein in the plurality of assemblies, both of the ends of the second bus bar in the circumferential direction (C) and both ends of the third bus bar in the circumferential direction (C) are spaced apart from each other in the circumferential direction (C) while being spaced apart from each other in the radial direction (R) or the axial direction (A),
    wherein the first bus bar crosses the second bus bar and the third bus bar,
    wherein the third bus bar is disposed further outward than the second bus bar in the radial direction (R),
    wherein in the plurality of assemblies, the second bus bar is disposed to be biased in a first circumferential direction (C1) of both directions of the circumferential direction (C) with respect to the stator core and the bobbin, and the third bus bar is disposed to be biased in a second circumferential direction (C2) of both of the directions of the circumferential direction (C) with respect to the stator core and the bobbin,
    wherein a bent portion bent in the axial direction (A) of the stator is disposed at each of both of the ends of the first to third bus bars in the circumferential direction (C),
    wherein the plurality of assemblies are divided into one or more first assemblies, one or more second assemblies, and one or more third assemblies,
    each of the first assemblies, each of the second assemblies, and each of the third assemblies are alternately arranged along the circumferential direction (C), and
    wherein a first one of the bent portions disposed in the first bus bar of a first assembly among the one or more first assemblies is joined to a first one of the bent portions disposed in the third bus bar of a second assembly, disposed immediately after the first assembly among the one or more second assemblies, to form a junction region, and a second one of the bent portions disposed in the first bus bar of the first assembly is joined to a first one of the bent portions disposed in the second bus bar of a third assembly, disposed immediately before the first assembly among the one or more third assemblies, to form a junction region, a first one of the bent portions disposed in the second bus bar of the first assembly is joined to a first one of the bent portions disposed in the first bus bar of the second assembly to form a junction region, and a second one of the bent portions disposed in the second bus bar of the first assembly is joined to a first one of the bent portions disposed in the third bus bar of the third assembly to form a junction region, and a first one of the bent portions disposed in the third bus bar of the first assembly is joined to a first one of the bent portions disposed in the second bus bar of the second assembly to form a junction region, and a second one of the bent portions disposed in the third bus bar of the first assembly is joined to a first one of the bent portions disposed in the first bus bar of the third assembly to form a junction region.

\* \* \* \* \*